3,401,155
PROCESS FOR THE PRODUCTION OF FLUO-
RINATED POLYMERIC MATERIALS
Giancarlo Borsini and Mario Modena, Milan, and Carlo
Nicora, Varese, and Mario Ragazzini, Milan, Italy, as-
signors to Montecatini Edison S.p.A., Milan, Italy
No Drawing. Filed Oct. 4, 1966, Ser. No. 584,094
Claims priority, application Italy, Oct. 4, 1965,
22,092/65
10 Claims. (Cl. 260—87.7)

ABSTRACT OF THE DISCLOSURE

A process for the production of highly linear fluorinated polymers of improved mechanical characteristics, comprising polymerizing, at low temperature, fluorine-substituted ethylene monomers in the presence of a redox catalyst comprised of (A) at least one organometallic compound of the formula:

wherein Me is a metal selected from the group consisting of germanium, tin and lead, $R'$ is a member selected from the group consisting of lower alkyl of up to 8 carbon atoms, aryl of up to 10 carbon atoms, cyclo-lower alkyl of up to 8 carbon atoms and lower alkaryl of up to 18 carbon atoms, and $R''$ and $R'''$ which may be the same or different are members selected from the group consisting of $R'$, halo, nitrate, lower alkoxy or up to 8 carbon atoms, carboxy and divalent cations of a strong inorganic acid and (B) at least one tetravalent cerium salt of a strong inorganic acid, and in the further presence of an inert solvent for the active catalyst.

---

The present invention relates to a process for the production of fluorinated polymeric materials of enhanced mechanical characteristics via copolymerization at low temperature of ethylene and alpha-olefins with ethylenically unsaturated fluorinated monomers, and via the homopolymerization of said ethylenically unsaturated fluorinated monomers, in the presence of a catalytic system comprising a mixture of at least one reducing agent and at least one oxidizing agent.

The great influence of the polymerization temperature upon the characteristics of the resultant polymers, which characteristics are linked to the linearity of the polymer chain, is already well known.

The "chain transfer" reactions that may take place during polymerization, and which are the more frequent the higher the temperature whereat the polymerization is conducted, in fact influence the growth of the macromolecule, in the sense that they tend to give rise to branching of the pre-existing macromolecules. Therefore, in order to obtain highly linear polymers and thus polymers provided with good mechanical characteristics, it is necessary to conduct the polymerization at the lowest possible temperatures, but at temperatures which are nevertheless compatible with the other parameters of the reaction.

The low polymerization temperature permits a greater regularity of the macromolecular chain, both from the point of view of a more orderly succession of "head-to-tail" configurations, as well as from the point of view of a more orderly distribution of the asymmetry centers along the chain itself. The regularity of a macromolecular chain having sufficiently high molecular weight permits of a better intermolecular attraction, which in turn favorably reflects on the mechanical characteristics of the polymer.

Thus, by operating at a low temperature, it is possible to obtain polymers having an orderly linear chain and thus having a greater degree of intermolecular cohesion within the polymer, which in turn effects a higher softening temperature, greater thermal resistance, resistance to solvents, impermeability to gases and liquids, better rigidity, tensile strength, compression resistance and improved molding characteristics, as well as better workability in general.

It is known that oxidation-reduction catalytic (redox) systems, because of the smaller activation energy required for the production of chain-initiating radicals, allow one to conduct the polymerization of unsaturated fluorinated monomers and the copolymerization of ethylene and α-olefins with unsaturated monomers at relatively low temperatures.

In fact, catalytic systems of the redox-type have been suggested that are capable of effecting the polymerization of unsaturated monomers at temperatures below +20° C. However, with these catalytic systems the polymerization speeds obtained at such low temperatures (e.g. −50° C.) are actually so low as to be industrially unacceptable. Furthermore, some of these catalytic systems, which do work for certain unsaturated monomers, for example chlorides, are not equally as suitable for fluorinated olefins, inasmuch as they interfere with the polymerization reaction as inhibitors or chain transfer agents.

Thus, an object of this invention is that of providing a process for the polymerization at low temperatures of ethylenically unsaturated fluorinated monomers or for the copolymerisation of ethylene and α-olefins with ethylenically unsaturated fluorinated monomers, by using a redox-type catalytic system which is free of the drawbacks presented by known processes.

Another object of this invention is that of providing a process for the homopolymerization and copolymerization of unsaturated fluorinated monomers, and for the copolymerization of said unsaturated fluorinated monomers with ethylene and α-olefins, capable of affording polymers, copolymers, terpolymers and other polymeric materials of improved mechanical and thermal properties which will also exhibit good workability.

These and still other objects will be attained through the process according to this invention, which process will offer considerable advantages over the systems known heretofore in the prior art.

Thus, one advantage of the process according to the present invention is represented by the fact that the use of particular catalysts permits one to operate at rather low temperatures, thus enabling production of polymers with a linear chain, an orderly distribution of the asymmetric points, and concomitant excellent improvement of all of the properties of the polymer bound to these factors.

Still another advantage of the process according to the invention consists in the use, as catalysts, of inexpensive products of wide commercial availability, of a high catalytic activity and of great selectivity.

A further advantage, which favorably affects the cost of the process, lies in the fact that the oxidizing component of the catalyst at the end of the reaction may be recovered, re-oxidized and finally recycled.

One more advantage of the process according to this invention is that of providing polymeric molding materials having excellent mechanical, thermal and workability characteristics.

Still further advantages will become evident during the course of the description of the process of this invention, according to which polymers and copolymers with the hereinbefore mentioned improved characteristics are obtained via the polymerization at low temperatures of unsaturated fluorinated monomers or via the copolymerization of ethylene or α-olefins with unsaturated fluorinated monomers or of these latter monomers among themselves, by using a new redox-type catalytic system comprised of at least one compound of an oxidizing character and of at least one compound of a reducing character.

In point of fact, it has surprisingly been found that, according to this invention, polymers and copolymers of enhanced characteristics may be prepared by the polymerization of unsaturated polymers at low temperature, by employing a new catalytic system of the redox type, comprised of at least one organometallic compound of the type:

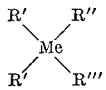

wherein Me is a metal such as Ge, Sn, Pb and each R' represents an organic radical selected from the group consisting of lower alkyl of up to 8 carbon atoms, of aryl of up to 10 carbon atoms, of cyclo-lower alkyl of up to 8 carbon atoms and of lower alkyl-aryl radicals; R'' and R''' may be the same or different and can represent single radicals of a group such as the above identified or polar members such as the halogens, nitrate

lower alkoxy of up to 8 carbon atoms, carboxy groups and the like; R'' and R''' can also be individual radicals of a bivalent group (e.g. $SO_4^=$); and further comprised of at least one tetravalent cerium salt.

The redox catalytic system according to the invention is thus comprised of an organometallic reducing compound and of an oxidizing compound, the tetravalent cerium salt.

According to a non-limiting theory of the present invention, the formation of radicals, capable of initiating polymerization even at very low temperatures, allegedly takes place according to the following scheme:

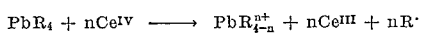

wherein: $n$ may be 1 or 2 and where $Ce^{IV}$ and $Ce^{III}$ represent the possible forms in which the tetravalent and trivalent Ce may find itself in the system under examination.

From the aforesaid, the necessity for the simultaneous presence of the organometallic compound and of the cerium salt becomes evident, the latter being present in its highest state of oxidation, i.e. as tetravalent Ce. Equally as evident is the role of the organometallic compound, which replaces the usual reducers of the known redox-systems. The class of catalytic systems according to the present invention are surprisingly active, even at temperatures whereat conventional redox-systems are unable to afford polymerization speeds useful from an industrial point of view.

The unsaturated monomers that may be polymerized singly or in suitable admixtures with each other, or copolymerized with ethylene and α-olefins according to the process of this invention, may be selected from a very wide range of compounds.

Particularly favorable results may be obtained according to this invention by employing ethylenically unsaturated fluorinated compounds such as, for example, tetrafluoroethylene, monochlorotrifluoroethylene, vinyl fluoride, vinylidene fluoride, trifluoroethylene, and vinylene fluoride (FHC=CHF).

Said fluorinated monomers, according to this invention, can be homopolymerized and copolymerized among themselves or with ethylene and α-olefins and other ethylenically unsaturated compounds such as, for example, propylene, isobutene, butadiene, styrene and their analogs. Equally advantageous, according to this invention, proves to be the production of terpolymers or other copolymers prepared from more than two of the monomers belonging to the above mentioned classes.

The organometallic compounds that can be used as components of the catalytic system, according to this invention, may also be selected from a wide range of compounds. Particularly advantageous proved to be the use of organometallic derivatives of Sn and of Pb, such as, for example $(C_4H_9)_4Sn$, $(C_6H_5)_4Sn$, $(CH_3)_4Pb$ and $(C_2H_5)_4Pb$. Such compounds may be used either singly or in suitable admixtures with each other.

The compounds of tetravalent cerium which may be used in the process according to this invention, are generally the tetravalent cerium salts soluble in the polymerization mixture; good results are obtained by using cerium nitrate, cerium sulfate, cerium iodate, cerium perchlorate, cerium-ammonium nitrate, cerium-ammonium sulfate, cerium-ammonium pyrophosphate and any other tetravalent cerium compound soluble in the reaction medium.

These compounds, used either singly or in admixture with each other, may be added wholly at the beginning of the reaction or may be added in a continuous manner over the duration of the polymerization.

Particularly appreciable results have been obtained by using a redox type catalytic system comprised of tetraalkyl lead and by an amonium and tetravalent cerium salt of a strong inorganic acid such as sulfuric acid, nitric acid and pyrophosphoric acid.

The catalytic system, according to this invention permits one to operate, with appreciable economic yields, at temperatures lower by from 20° C. to 60° C. than those generally used with standard catalytic systems; therefore, polymers and copolymers are obtained having enhanced mechanical characteristics that can only be related to the low polymerization temperature.

At any rate, it is understood that the process for the preparation of polymeric materials according to this invention may be conducted at temperatures varying from −100° C. to +50° C., but preferably from −60° C. to +20° C.

The polymerization process, according to this invention, is conducted in the presence of a solvent capable of maintaining in solution the active components of the catalytic system, i.e., the organometallic compound and the cerium ion, the latter in any form that it may be present.

Particularly suited for this purpose have proved to be ketones, ethers, nitriles, amides and alcohols with a low number of carbon atoms, other organic polar compounds, and water-organic solvent mixtures of such composition, so as not to congeal and to have a dissolving capacity with respect to the organometallic compound and to the derivative of the tetravalent cerium.

It has been found that the use of mixtures of $H_2O$ and butanol, containing high percentages of tertiary butanol and a suitable quantity of methanol to lower the freezing point of the mixture are quite convenient; also advantageous are mixtures of trichloro-trifluoro-ethane, butanol and methanol. Further advantages are also obtained with mixtures of water soluble ethers, dioxane and tetrahydrofuran.

Particularly favorable results are achieved by operating in acid ambient with a pH lower than 5.

The polymerization process, according to this invention, is generally carried out using a catalytic system comprised of an organometallic compound and a tetravalent cerium salt in quantities, respectively, ranging from 0.01 to 2 and from 0.001 to 1 part by weight, given as metallic cerium, for 100 parts by weight of monomer or of monomer mixture.

One of the advantages afforded by the process of this invention is the possibility of recovering almost completely, at the termination of the polymerization reaction, the cerium salt, in the form of a trivalent cerium salt, which can be re-oxidized and again recycled as the oxidizing component of the catalytic system.

The cerium salt recovered from the polymer washing liquids is generally re-oxidized by means of NaClO or $PbO_2$ and $HNO_3$ or by simply heating in air the trivalent cerium hydrate.

According to a preferential embodiment of this invention, the catalytic system, i.e., $Pb(C_2H_5)_4$ and $(NH_4)_2Ce(NO_3)_6$ (this latter being dissolved in a suitable solvent, for example $CH_3OH$) is added to the monomer or to a mixture of unsatured monomers freshly distilled. The two components of the catalytic system are added separately.

The polymeric materials obtained according to this invention find use in many different fields of industry as molding materials possessing good workability characteristics and are such as to supply manufacturers with the best mechanical and thermal properties.

In order to further illustrate the present invention and the advantages thereof, the following specific examples are given, it being understood that the same are merely intended to be illustrative and not limitative.

Example 1

A stainless steel autoclave, having a capacity of 2 litres, equipped with stirrer and thermoregulation jacket, was scavenged, cooled to −5° C. and then charged with a solution of 0.975 ml. of tetraethyl lead in 900 ml. of a mixture of tertiary butanol and water in the ratio of about 8.5 to 1.5 by volume.

A mixture of ethylene and tetrafluoroethylene, containing 14 mol percent tetrafluoroethylene, was then introduced until a pressure of 20 atmospheres was reached. A solution of 2.74 g. of $(NH_4)_2Ce(NO_3)_6$ and of 2 ml $HNO_3$ 65% in 200 cc. of a mixture formed from tertiary butanol and water (in the previously mentioned ratios) was subsequently fed therein.

Pressure and temperature were kept constant for 3 hours and 40 minutes. Thereafter a mixture formed of 50 cc. methanol, 3 cc. of 30% hydrogen peroxide and 5 cc. of 65% $HNO_3$, was fed into the autoclave.

The excess gas was eliminated and the reaction mass discharged. The polymer was separated by filtering, washed with methanol and dried. A quantity of 39 g. of ethylene-tetrafluoroethylene copolymer was obtained and its elementary analysis showed 48.5% fluorine, corresponding to 33% by moles of tetrafluoroethylene.

This product contained no fraction soluble in boiling acetone and, submitted to fractional extraction in boiling xylene, 99% thereof remained insoluble. The melting point, determined via the disappearance of birefringence in a polarized light microscope, was 237° C.

This product was workable according to techniques suitable for thermoplastics and did not exhibit any appreciable degradation.

The coefficient of rigidity (G′) determined by a damping test, was $6 \times 10^8$ at 100° C., and $1 \times 10^8$ at 214° C.

On the contrary, an ethylene-tetrafluoroethylene copolymer having the same composition, and prepared in the same solvent but at 70° C. using an ammonium persulfate initiator, was partially soluble in boiling acetone (5%) and xylene (80%), and underwent severe degradation whenever submitted to press or extruder molding, and had a coefficient of rigidity equal to $3 \times 10^8$ at 100° C. and $1 \times 10^8$ at 174° C.

Example 2

A stainless steel autoclave, having a capacity of ½ litre, equipped with stirrer and thermoregulation jacket, was scavenged, cooled to −15° C. and charged with a solution of 0.24 ml. tetraethyl lead in 100 ml. of a mixture formed from tertiary butanol, water and methanol with ratios 8:1:1 by volume. A solution of 0.69 g. of

and of 0.5 ml. of $HNO_3$ at 65% in 200 ml. of the above specified solvent mixture was then fed therein. A mixture of tetrafluoroethylene and ethylene containing 12.5% moles of tetrafluoroethylene was subsequently introduced until a pressure of 14.51 atmospheres was attained in the autoclave.

After approximately 3 hours of reaction at constant temperature and pressure, the catalyst was quenched by means of a mixture consisting of methanol (50 ml.), $H_2O_2$ at 30% (3 ml.) and $HNO_3$ at 65% (5 ml.): the excess gas was expelled and the reaction mass discharged.

A quantity of 7 g. polymer was obtained, melting at 235°–236° C. and having 47.5% of fluorine, corresponding to 32% moles of $C_2F_4$.

Example 3

Solvent and catalysts in the quantity specified in Example 2 were fed into an autoclave having a capacity of ½ litre, and cooled to −15° C. A mixture of ethylene and monochlorotrifluoroethylene with 23% moles of monochlorotrifluoroethylene was introduced until a pressure of 13.54 atmospheres was attained.

The reaction was stopped after 3 hours and there was obtained a quantity of 9 g. of copolymer with 22.4% chlorine, corresponding to 39.5% moles of $C_2ClF_3$, and which melts at 181°–182° C.

Example 4

Solvent and catalysts as specified in Example 2 were fed into an autoclave having a capacity of ½ litre and cooled to −15° C. An approximately equimolecular mixture of tetrafluoroethylene and vinyl fluoride was thence added until a pressure of 15 atmospheres was reached.

The reaction, carried out under constant temperature and pressure, was stopped after 4 hours and there was obtained 24.5 g. of polymer with 57.5% fluorine, corresponding to 46.6% tetrafluoroethylene.

Example 5

A solution consisting of 120 ml. tertiary butanol, 15 ml. distilled water, 15 ml. methanol and 0.24 ml. tetraethyl lead was brought into a stainless steel autoclave having a capacity of 500 cc., previously cooled to −15° C. and freed of oxygen by nitrogen washing. A solution consisting of 0.69 g. of cerium ammonium nitrate and 0.5 ml. of nitric acid at 65% was added after some minutes.

A mixture consisting of tertiary butanol, methanol and water with ratios 8:1:1 of volume was used as a solvent for the cerium salt.

Approximately 200 g. of $C_2ClF_3$ (monochlorotrifluoroethylene) were subsequently charged therein.

The polymerization, carried out at −15° C., was stopped after 3 hours by means of a mixture consisting of methanol and hydrogen peroxide acidified with nitric acid; excess gas was eliminated and the reaction mass discharged. The polymer was separated from the reaction mass by filtering and washed with methanol. It had a weight of 3 g.

Example 6

A stainless steel autoclave, having a capacity of 2.5 litres, equipped with stirrer and thermoregulation jacket, was scavenged and cooled to −30° C. The following materials were then charged consecutively: 3.45 g. of

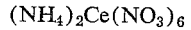

dissolved in 150 ml. of tertiary butanol and 75 ml. of methanol, 1.2 ml. tetraethyl lead dissolved in 1250 ml. of 1,1,2-trichloro-1,2,2 trifluoroethane and finally a mixture of ethylene and tetrafluoroethylene containing 12% moles of tetrafluoroethylene, in such quantity as to establish in the autoclave a pressure of 11 atmospheres.

The reaction, carried out at constant temperature and pressure, was stopped after 2 hours as previously specified and the polymer was recovered by filtering. The product yield was about 40 g.

As many apparently widely different embodiments of this invention may be made without departing from the spirit and scope thereof, it is to be understood that the same is not to be limited to the specific embodiments thereof, except as defined in the appended claims.

What is claimed is:

1. A process for the production of highly linear fluorinated polymers of improved mechanical characteristics, comprising polymerizing, at low temperature, fluorine-substituted ethylene monomers in the presence of a redox catalyst comprised of (A) at least one organometallic compound of the formula:

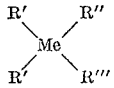

wherein Me is a metal selected from the group consisting of germanium, tin and lead, R' is a member selected from the group consisting of lower alkyl of up to 8 carbon atoms, aryl of up to 10 carbon atoms, cyclo-lower alkyl of up to 8 carbon atoms and lower alkaryl of up to 18 carbon atoms, and R'' and R''' which may be the same or different are members selected from the group consisting of R', halo, nitrate, lower alkoxy of up to 8 carbon atoms, carboxy and divalent cations of a strong inorganic acid and (B) at least one tetravalent cerium salt of a strong inorganic acid, and in the further presence of an inert solvent for the active catalyst.

2. The process as defined by claim 1, wherein the polymerization is conducted at temperatures of from $-100°$ C. to $+50°$ C.

3. The process as defined by claim 2, wherein the tetravalent cerium salt of a strong inorganic acid is selected from the group consisting of cerium nitrate, cerium sulfate, cerium iodate, cerium perchlorate, cerium-ammonium sulfate, cerium-ammonium nitrate, cerium-ammonium pyrophosphate and mixtures thereof.

4. The process as defined by claim 3, wherein the organometallic compound is selected from the group consisting of $Pb(C_2H_5)_4$, $Pb(CH_3)_4$, $Sn(C_4H_9)_4$, $Sn(C_6H_5)_4$ and mixtures thereof.

5. The process as defined by claim 4, wherein there is polymerized a fluorine-substituted ethylene monomer selected from the group consisting of tetrafluoroethylene, monochlorotrifluoroethylene, vinyl fluoride, vinylidene fluoride, trifluoroethylene, vinylene fluoride and mixtures thereof.

6. The process as defined by claim 5, wherein there is copolymerized with the said fluorine-substituted ethylene monomer a monomer selected from the group consisting of ethylene, propylene, isobutene, butadiene, styrene and mixtures thereof.

7. The process as defined by claim 5, wherein the organometallic compound is present in amounts of from 0.01 to 2 parts by weight per 100 parts by weight monomer and the tetravalent cerium salt of a strong inorganic acid, as metallic cerium, in amounts of from 0.001 to 1 part by weight per 100 parts by weight monomer.

8. The process as defined by claim 7, wherein the tetravalent cerium salt of a strong inorganic acid is wholly added at the beginning of the polymerization reaction.

9. The process as defined by claim 8, wherein the tetravalent cerium salt of a strong inorganic acid is continuously added throughout the course of the polymerization reaction.

10. The process as defined by claim 5, wherein the polymerization is conducted at a pH of less than 5, and further wherein the inert solvent is selected from the group consisting of ketones; ethers; nitriles; amides; lower alkanols; mixtures of water, butanol and methanol; mixtures of trichlorotrifluoroethane, butanol and methanol; and mixtures of water soluble ethers, dioxane and tetrahydrofuran.

References Cited
UNITED STATES PATENTS

| | | | |
|---|---|---|---|
| 2,921,060 | 1/1960 | Stuart | 260—94.9 |
| 2,925,409 | 2/1960 | Shearer et al. | 260—93.7 |
| 2,953,531 | 9/1960 | Anderson et al. | 252—429 |
| 3,210,329 | 10/1965 | Jenkins | 260—88.7 |

JOSEPH L. SCHOFER, *Primary Examiner.*

J. C. HAIGHT, *Assistant Examiner.*